United States Patent
Sonnenschein et al.

(10) Patent No.: US 9,708,444 B2
(45) Date of Patent: Jul. 18, 2017

(54) BIODEGRADABLE ALIPHATIC POLYESTERS

(71) Applicant: Dow Global Technologies LLC, Midland, MI (US)

(72) Inventors: Mark F. Sonnenschein, Midland, MI (US); Chaofang Yue, Midland, MI (US); Xin Jin, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/037,563

(22) PCT Filed: Nov. 5, 2014

(86) PCT No.: PCT/US2014/064079
§ 371 (c)(1),
(2) Date: May 18, 2016

(87) PCT Pub. No.: WO2015/077023
PCT Pub. Date: May 28, 2015

(65) Prior Publication Data
US 2016/0297922 A1    Oct. 13, 2016

Related U.S. Application Data

(60) Provisional application No. 62/045,280, filed on Sep. 3, 2014, provisional application No. 61/908,208, filed on Nov. 25, 2013.

(51) Int. Cl.
*C08G 61/12* (2006.01)
*C08G 63/91* (2006.01)
*C08G 65/332* (2006.01)

(52) U.S. Cl.
CPC .............. *C08G 61/12* (2013.01); *C08G 63/91* (2013.01); *C08G 65/332* (2013.01); *C08G 2261/334* (2013.01); *C08G 2261/40* (2013.01); *C08G 2261/42* (2013.01); *C08G 2261/50* (2013.01)

(58) Field of Classification Search
CPC ...... C08G 61/12; C08G 63/91; C08G 65/332; C08G 2261/334; C08G 2261/42; C08G 2261/40; C08G 2261/50
USPC ........................................................ 526/325
See application file for complete search history.

(56) References Cited

U.S. PATENT DOCUMENTS

| | | | |
|---|---|---|---|
| 6,706,414 B1* | 3/2004 | Dammann | C08F 222/1006 428/413 |
| 7,514,528 B2 | 4/2009 | Kauffman et al. | |
| 7,919,540 B2* | 4/2011 | Heuts | C08J 9/141 521/182 |
| 9,279,040 B2 | 3/2016 | Jin et al. | |
| 2005/0059796 A1* | 3/2005 | Bastioli | C08G 63/20 528/272 |
| 2005/0081994 A1* | 4/2005 | Beckley | C08J 9/32 156/325 |
| 2005/0081995 A1 | 4/2005 | Beckley et al. | |
| 2011/0190468 A1* | 8/2011 | Xu | C08G 18/4225 528/45 |
| 2013/0233739 A1* | 9/2013 | Zhao | C08K 3/34 206/223 |

FOREIGN PATENT DOCUMENTS

WO      9825989 A1   6/1998

OTHER PUBLICATIONS

Cho, et al., "Preparation of polyesteramine from polyethylenimine and polycaprolactone diacrylate and its use as vector for gene transformation," Chem. Abstract, (2008).

* cited by examiner

*Primary Examiner* — Michael M Bernshteyn
(74) *Attorney, Agent, or Firm* — Kenneth Crimaldi

(57) ABSTRACT

A biodegradable aliphatic polyester which is a reaction product of a functional Michael acceptor and a functional Michael donor, wherein the functional Michael acceptor comprises $R^1(A)_n$ and the functional Michael donor comprises $R^2(D)_m$, wherein A is a functional Michael acceptor moiety, D is a functional Michael donor moiety, n is an integer which is at least one, m is an integer which is at least one, $R^1$ and $R^2$ are biodegradable structures.

8 Claims, No Drawings

BIODEGRADABLE ALIPHATIC POLYESTERS

BACKGROUND

This invention relates to biodegradable aliphatic polyesters made in a carbon-Michael-addition reaction.

U.S. Pat. No. 7,919,540 discloses rigid, low density foam whose formation relies on carbon-Michael chemistry instead of polyurethane chemistry. The invention of U.S. Pat. No. 7,919,540 is foam comprising the reaction product of one or more multifunctional acrylate compounds (Michael acceptors) with one or more multifunctional Michael donor selected from aceto- or cyano-acetate compounds or acetoacetamides in the presence of a base and a blowing agent. However, this reference does not disclose a biodegradable polyester made via carbon-carbon bond formation in a Michael addition reaction.

STATEMENT OF INVENTION

A biodegradable aliphatic polyester which is a reaction product of a functional Michael acceptor and a functional Michael donor, wherein the functional Michael acceptor comprises $R^1(A)_n$ and the functional Michael donor comprises $R^2(D)_m$, wherein A is a functional Michael acceptor moiety, D is a functional Michael donor moiety, n is an integer which is at least one, m is an integer which is at least one, $R^1$ and $R^2$ are biodegradable structures.

DETAILED DESCRIPTION

All temperatures are in ° C. and all percentages are weight percentages (wt %), unless specified otherwise. Room temperature is 20-25° C. The term "(meth)acrylate" means acrylate or methacrylate. For purposes of this invention, a "multifunctional Michael acceptor" is a compound that has multiple Michael acceptor functionalities per molecule. A "Michael acceptor functionality" is an activated alkene having an aliphatic carbon-carbon double or triple bond alpha to a carbonyl (an "enone" group) or, less preferably, a nitro group. The preferred enone-containing Michael acceptors include, compounds containing two or more (meth) acrylate residues. These preferred multifunctional Michael acceptors include compounds having two or more (meth) acrylate ester or (meth)acrylate amide groups. For purposes of this invention, a "multifunctional carbon-Michael donor" is a material that contains one or more carbon-Michael donor functionalities and can react with two or more carbon-Michael acceptor functionalities to form a carbon-carbon bond to each of the carbon-Michael acceptor functionalities. Michael donor functionalities are groups that in the presence of a carbon-Michael reaction catalyst form a carbanion that reacts with the carbon-carbon double or triple bond of a Michael acceptor group to form a carbon-carbon bond to the Michael acceptor group. Suitable Michael donor functionalities include two or more β-diketo and β-cyanoketo moieties, i.e., moieties represented by the structures:

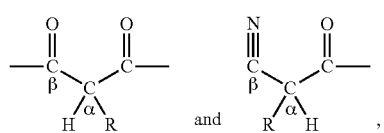

respectively. Among the suitable carbon Michael donors having β-diketo moieties are compounds containing one or more acetoacetate ester, acetoacetamide, and/or malonate mono- or diester groups. Among the suitable carbon Michael donors having β-cyanoketo moieties are compounds containing one or more cyanoacetate ester and/or cyanoacetamide groups.

Examples of useful multifunctional carbon-Michael donors include acetoacetone, acetoacetate esters, cyanoacetate esters and malonic acid esters of polyhydric alcohols such as ethylene glycol, 1,2- or 1,3-propane diol, 1,4-butane diol, 1,2-butanediol, 1,6-hexanediol, neopentyl glycol, 2-methyl-1,3-propane diol, diethylene glycol, triethylene glycol, dipropylene glycol, tripropylene glycol, poly(propylene glycol), poly(ethylene glycol), cyclohexanedimethanol, trimethylol propane, trimethylol propane, pentaerythritol, glycerin, glycerol, dipentaerythritol, di-trimethylolpropane, glucose, isosorbide, butyl ethyl propanediol and the like. Acetoacetate-functional or cyanoacetate-functional polyethers, polyesters or polyesteramides are also useful.

Some carbon-Michael donor functionalities can react difunctionally with carbon-Michael acceptor functionalities. Examples of such functionalities include β-diketo and β-cyanoketo moieties such as those having the structures above, in which R is hydrogen. In such a case, it is only necessary that one carbon-Michael donor functionality be present on the multifunctional carbon-Michael donor (i.e., m=1). If the carbon-Michael donor functionality is only capable of reacting with a single carbon-Michael acceptor functionality (as is the case when R is other than hydrogen in the structures above), the carbon-Michael donor needs to have at least two carbon Michael donor functionalities per molecule.

Additional examples of useful multifunctional carbon-Michael donors include acetoacetamides and cyanoacetamides of amine compounds having two or more amine hydrogen atoms such as ethylene diamine, triethylene diamine, tetraethylene triamine, piperazine, isophorone diamine, hexamethylene diamine, 1,4-butane diamine, diethyltoluenediamine, phenylene diamine, various polymeric polyamines, and the like. Acetoacetamide-functional and cyanoacetamide-functional polyethers, polyesters or polyesteramides are also useful.

Preferably, n is an integer from 2 to 10, preferably from 2 to 6, preferably from 2 to 4. Preferably, m is an integer from 2 to 10, preferably from 2 to 6, preferably from 2 to 4.

A biodegradable structure is one meeting the criteria of either the OECD Test Guidelines for biodegradability of organic chemicals or of the ASTM D7475 standard test method for determining aerobic degradation and anaerobic biodegradation of plastics under accelerated bioreactor landfill conditions. Preferably, the biodegradable structure is derived from a biodegradable polyol. Preferred examples of biodegradable polyols include, but are not limited to, polyglycolic acid (PGA) polyol, polylactic acid (PLA) polyol, poly(lactic-co-glycolic acid), poly (glycolide-co-trimethylene carbonate) polyol, polyhydroxybutyrate polyol, poly(ethylene glycol) (PEG) polyol, aliphatic polyester polyol with ethylene glycol segments, poly vinyl alcohol and its copolymers, vinyl pyrrolidone copolymer, trimethylolpropane, pentaerythritol, 1,3-butylene glycol, neopentyl glycol, xylitol, sorbitol, mannitol, and maltitol. Another preferred biodegradable structure is derived from a polyacid, for example, polymethacrylic acid and polyacrylic acid.

Preferably, the multifunctional Michael acceptor(s), $R^1(A)_n$, have an average equivalent weight per Michael acceptor functionality from 85 to 3,000, preferably from 100 to 1,000. Preferably, when producing a material comprising the biodegradable aliphatic polyester, the average equivalent weight per Michael acceptor functionality is from 100 to 500, preferably from 100 to 300. Preferably, the multifunctional Michael donor(s), $R^2(D)_m$, have an average equivalent weight per Michael donor functionality from 85 to 3,000, preferably from 100 to 1,000. Preferably, when producing a material comprising the biodegradable aliphatic polyester, the average equivalent weight per Michael donor functionality is from 100 to 500, preferably from 100 to 300.

In a preferred embodiment, the biodegradable aliphatic polyester is prepared from a mixture of multifunctional Michael acceptor compounds and a mixture of multifunctional Michael donor compounds. Such a multifunctional Michael acceptor mixture may include, for example, a Michael acceptor with a biodegradable structure $R^1$ and a Michael acceptor without a biodegradable structure or with a non-biodegradable structure. Such a multifunctional Michael donor mixture may include, for example, a Michael donor with a biodegradable structure $R^2$ and a Michael donor without a biodegradable structure or with a non-biodegradable structure. Preferably, the Michael acceptor comprises from 10 to 100 wt % biodegradable structures (based on total weight of biodegradable and non-biodegradable structures in the acceptors and donors), preferably at least 25 wt %, preferably at least 40 wt %, preferably at least 50 wt %, preferably at least 60 wt %, preferably at least 70 wt %. Preferably, the Michael donor comprises from 10 to 100 wt % biodegradable structures (based on total weight of biodegradable and non-biodegradable structures in the acceptors and donors), preferably at least 25 wt %, preferably at least 40 wt %, preferably at least 50 wt %, preferably at least 60 wt %, preferably at least 70 wt %. Preferably, at least 10 wt % of the biodegradable aliphatic polyester is biodegradable, preferably at least 20 wt %, preferably at least 30 wt %, preferably at least 40 wt %, preferably at least 50 wt %, preferably at least 60 wt %, preferably at least 70 wt %.

The amounts of Michael acceptor and carbon-Michael donor compounds preferably are selected to provide at least one mole of Michael acceptor functionalities(s) per mole of carbon-Michael donor functionalities, preferably at least 1.1 moles. This ratio preferably is no greater than 3 moles of Michael acceptor functionalities per mole of multifunctional carbon-Michael donor functionalities, particularly in the case in which the carbon-Michael donor reacts difunctionally with the carbon-Michael acceptor. A preferred ratio is from 1.2:1 to 2.5:1 and a still more preferred ratio is from 1.4:1 to 2.1:1.

Suitable carbon-Michael reaction catalysts include basic compounds such as described, for example, in US Published Patent Application No. 2005-0081994. Among the useful reaction catalysts include tertiary amine compounds, amidine compounds, quaternary ammonium hydroxides, alkali metal hydroxides, alkali metal alkoxides, alkali metal acetylacetonates, quaternary ammonium acetylacetonates and the like. Tertiary amine and amidine compounds are often preferred. Some suitable amidine compounds include, for example, guanidine and cyclic amidine compounds such as, for example, N,N,N',N'-tetramethylguanidine (TMG), 1,8-diazabicyclo[5.4.0]undec-7-ene (DBU) and 1,5-diazabicyclo[4.3.0]non-5-ene (DBE). Among the suitable ammonium compounds are, for example, quaternary ammonium hydroxides such as, for example, tetramethyl ammonium hydroxide, tetraethyl ammonium hydroxide, tetrabutyl ammonium hydroxide, and tetraoctyl ammonium hydroxide.

Some suitable amine compounds are, for example, trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-cocomorpholine, N,N-dimethyl aminomethyl N-methyl ethanol amine, N, N, N'-trimethyl-N'-hydroxyethyl bis(aminoethyl) ether, N,N-bis(3-dimethylaminopropyl)N-isopropanolamine, (N,N-dimethyl) amino-ethoxy ethanol, N, N, N', N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine. Nitrogen-containing catalysts having no N—H bonds are preferred. TMG and DBU are especially preferred.

A catalytic amount of the carbon-Michael reaction catalyst is present during a curing step, in which the donor and acceptor moieties react to form the biodegradable aliphatic polyester. A preferred amount of catalyst is from 0.001 to 1, preferably from 0.01 to 0.75, preferably from 0.1 to 0.5 and preferably 0.1 to 0.25 moles of carbon-Michael reaction catalyst per equivalent of carbon-Michael donor functionalities, although optimum amounts in any specific case may depend on the particular catalyst. Certain amine and amidine catalysts may tend to increase the viscosity of the B-side component significantly if present therein in amounts greater than about 0.25 moles of catalyst per equivalent of multifunctional carbon-Michael donor.

The reaction mixture may contain optional ingredients such as one or more plasticizers, one or more fillers, one or more blowing agents, one or more surfactants, one or more colorants, one or more preservatives, one or more odor masks, one or more flame retardants, one or more biocides, one or more antioxidants, one or more UV stabilizers, one or more antistatic agents, one or more foam cell nucleators, and the like.

The biodegradable aliphatic polyester of this invention may be used in a variety of materials, e.g., rigid foams, flexible foams, elastomers, coatings, adhesives, sealants, and biomedical applications, including sutures, controlled drug release devices, and tissue engineering.

In a preferred embodiment, the invention is a rigid foam made using a polymeric spray foam system comprising:

(a) an A-side component comprising a multifunctional Michael acceptor that has multiple Michael acceptor functionalities per molecule and, dissolved in the A-side component, a blowing agent composition containing a blowing agent that has a boiling temperature in the range −40° C. to +10° C.; wherein the A-side component has a Brookfield viscosity of 2,500 centiPoise or less at 25° C.;

(b) a separate B-side component comprising a multifunctional carbon-Michael donor, a surfactant and, dissolved in the B-side component, a blowing agent composition containing a blowing agent that has a boiling temperature in the range −40° C. to +10° C.; wherein the B-side component has a Brookfield viscosity at 25° C. from 0.2 to 5 times that of the A-side component but not greater than 2,500 centiPoise; and (c) a carbon-Michael reaction catalyst.

A step of combining the components preferably is performed using any suitable mixing equipment, including static mixing equipment, impingement mixing equipment, or other suitable mixing equipment.

A step of combining the components preferably is performed and typically is exothermic and proceeds spontaneously at room temperature or slightly elevated temperature (up to 50° C.). Therefore, it is usually not necessary to apply heat to the reaction mixture to effect the cure. However, heating may be applied for a faster cure. Curing temperatures of up to 100° C. can be used. Curing to a tack-free state generally takes place in a matter of a few minutes.

EXAMPLES

In the Examples, various terms and designations for materials were used including, for example, the following:

Multifunctional acrylate compound (pentaerythritol triacrylate, product reference SR444, available from Sartomer), multifunctional acrylate compound (ethoxylated trimethylolpropane triacrylate, product reference SR454HP, available from Sartomer), multifunctional acrylate compound (di-trimethylolpropane tertraacrylate, product reference SR355, available from Sartomer), multifunctional acrylate compounds (polyethylene glycol diacrylates, product reference SR259, SR344 and SR610, available from Sartomer), multifunctional acrylate compound (bisphenol A epoxy diacrylate, product reference CN 120Z, available from Sartomer), 1,1,3,3-tetramethylguanidine (catalyst, available from Aldrich), surfactant (organosilicone surfactant, product reference Dabco DC193, available from Evonik Industries), surfactant (organosilicone surfactant, product reference TEGOSTAB® B 8469, available from Evonik Industries), 1,1,1,3,3-pentafluoropropane (blowing agent, product reference HFC 245fa, available from Honeywell Corporation), multifunctional acetoacetate compound (michael donor, trimethylolpropane tris acetoacetate, available from Lonza), diethyl phosphinic acid aluminium salt (solid additive, product reference Exolit OP 935, available from Clariant). All other chemicals were purchased from Aldrich and used as obtained.

Biodegradable Carbon-Michael Compound 1:

Biodegradable Carbon-Michael compound 1 was prepared as follows. SR444 (17.50 grams), SR259 (17.50 grams), 1,1,3,3-tetramethylguanidine (1.01 grams) and Dabco DC193 (0.81 grams) were added to a container and mechanically stirred for two minutes at approximately 900 rotations per minute. HFC 245fa (6.46 grams) was added to the contents of the container, which were mechanically stirred for an additional two minutes at approximately 900 rotations per minute. Trimethylolpropane tris acetoacetate (18.81 grams) was added to the contents of the container, then the contents of the container were mechanically stirred for 20 seconds at approximately 2500 rotations per minute to provide biodegradable Carbon-Michael compound 1.

Biodegradable Carbon-Michael Compound 2:

Biodegradable Carbon-Michael compound 2 was prepared as follows. SR444 (35.00 grams), 1,1,3,3-tetramethylguanidine (1.22 grams) and Dabco DC193 (0.87 grams) were added to a container and mechanically stirred for two minutes at approximately 900 rotations per minute. HFC 245fa (6.92 grams) was added to the contents of the container, which were mechanically stirred for an additional two minutes at approximately 900 rotations per minute. Trimethylolpropane tris acetoacetate (22.69 grams) was added to the contents of the container, then the contents of the container were mechanically stirred for 20 seconds at approximately 2500 rotations per minute to provide biodegradable Carbon-Michael compound 2.

Biodegradable Carbon-Michael Compound 3:

Biodegradable Carbon-Michael compound 3 was prepared as follows. SR454HP (30.00 grams), SR610 (10.00 grams), 1,1,3,3-tetramethylguanidine (0.96 grams) and Dabco DC193 (0.83 grams) were added to a container and mechanically stirred for two minutes at approximately 900 rotations per minute. HFC 245fa (6.63 grams) was added to the contents of the container, which were mechanically stirred for an additional two minutes at approximately 900 rotations per minute. Trimethylolpropane tris acetoacetate (15.28 grams) was added to the contents of the container, then the contents of the container were mechanically stirred for 20 seconds at approximately 2500 rotations per minute to provide biodegradable Carbon-Michael compound 3.

Biodegradable Carbon-Michael Compound 4:

Biodegradable Carbon-Michael compound 4 was prepared as follows. SR444 (22.50 grams), SR610 (22.50 grams), 1,1,3,3-tetramethylguanidine (0.99 grams) and Dabco DC193 (0.95 grams) were added to a container and mechanically stirred for two minutes at approximately 900 rotations per minute. HFC 245fa (7.62 grams) was added to the contents of the container, which were mechanically stirred for an additional two minutes at approximately 900 rotations per minute. Trimethylolpropane tris acetoacetate (18.49 grams) was added to the contents of the container, then the contents of the container were mechanically stirred for 20 seconds at approximately 2500 rotations per minute to provide biodegradable Carbon-Michael compound 4.

Biodegradable Carbon-Michael Compound 5:

Biodegradable Carbon-Michael compound 5 was prepared as follows. SR259 (50.00 grams), 1,1,3,3-tetramethylguanidine (1.53 grams), Exolit OP 935 (7.70 grams) and Dabco DC193 (1.07 grams) were added to a container and mechanically stirred for two minutes at approximately 900 rotations per minute. HFC 245fa (7.13 grams) was added to the contents of the container, which were mechanically stirred for an additional two minutes at approximately 900 rotations per minute. Trimethylolpropane tris acetoacetate (21.32 grams) was added to the contents of the container, then the contents of the container were mechanically stirred for 20 seconds at approximately 2500 rotations per minute to provide biodegradable Carbon-Michael compound 5.

Biodegradable Carbon-Michael Compound 6:

Biodegradable Carbon-Michael compound 6 was prepared as follows. SR610 (60.00 grams), 1,1,3,3-tetramethylguanidine (1.12 grams), Exolit OP 935 (11.35 grams) and Dabco DC193 (1.06 grams) were added to a container and mechanically stirred for two minutes at approximately 900 rotations per minute. HFC 245fa (7.04 grams) was added to the contents of the container, which were mechanically stirred for an additional two minutes at approximately 900 rotations per minute. Trimethylolpropane tris acetoacetate (10.41 grams) was added to the contents of the container, then the contents of the container were mechanically stirred for 20 seconds at approximately 2500 rotations per minute to provide biodegradable Carbon-Michael compound 6.

Carbon-Michael Comparative Compound 1:

Carbon-Michael comparative compound 1 was prepared as follows. CN120Z (44.00 grams) was heated to 60° C. The pre-heated CN120Z, SR355 (88.00 grams), 1,1,3,3-tetramethylguanidine (2.70 grams) and TEGOSTAB® B 8469 (2.88 grams) were added to a container and mechanically stirred for two minutes at approximately 900 rotations per minute. HFC 245fa (38.46 grams) was added to the contents of the container, which were mechanically stirred for an additional two minutes at approximately 900 rotations per minute. Trimethylolpropane tris acetoacetate (60.29 grams) was added to the contents of the container, then the contents of the container were mechanically stirred for 30 seconds at approximately 2500 rotations per minute to provide Carbon-Michael comparative compound 1.

The biodegradability of Carbon-Michael compounds was measured by a Manometric Respirometry Test that follows OECD 301F guidelines. Briefly, a test compound is diluted in a phosphate buffer medium to a typical concentration of 50-100 mg/L ThOD (theoretical oxygen demand) that contains 30 mg/L activated sludge obtained from municipal wastewater treatment plant. The test was conducted at approximately 22° C. and oxygen demand was monitored during the course of the test. Standard 301F test is 28 days but the test was prolonged beyond that to 49 days. The OECD 301F results are illustrated in Table 1, where $D_{O2}$(%) stands for the percentage of biodegradation calculated by comparing actual oxygen demand vs. ThOD.

TABLE 1

Biodegradation results by OECD measurement

| | Carbon - Michael compound # | | | | | | |
|---|---|---|---|---|---|---|---|
| | 1 | 2 | 3 | 4 | 5 | 6 | Comparative 1 |
| $D_{O2}$ (%, 28 days) | 10.8 | 13.5 | 11.8 | 12.6 | 11.7 | 13.4 | 1.1 |
| $D_{O2}$ (%, 49 days) | 17.7 | 23.4 | 19.5 | 20.2 | 20.4 | 24.2 | Not measured |

The 28 day data in Table 1 demonstrate that each of the biodegradable carbon-Michael compounds 1-6 generated obvious biodegradation results, while the comparative compound 1 showed no apparent biodegradation signal. The OECD result of the comparative compound 1 is negligible considering the measurement background signal variations. The 49 day data further indicate that some Carbon-Michael samples, 2, 4, 5 and 6, are consistent with the OECD classification of having inherent, primary biodegradability. In addition, by 49 days none of the biodegradation curves of the Carbon-Michael compounds had reached a plateau, indicating possibly higher level of % biodegradation of the samples.

The invention claimed is:

1. A biodegradable aliphatic polyester which is a reaction product of a functional Michael acceptor and a functional Michael donor, wherein the functional Michael acceptor comprises $R^1(A)_n$ and the functional Michael donor comprises $R^2(D)_m$, wherein A is a functional Michael acceptor moiety, D is a functional Michael donor moiety, n is an integer from 2 to 10, m is an integer from 2 to 10, and $R^1$ and $R^2$ are biodegradable structures selected from the group consisting of polyglycolic acid polyol, polylactic acid polyol, poly(lactic-co-glycolic acid), poly (glycolide-co-trimethylene carbonate) polyol, polyhydroxybutyrate polyol, poly(ethylene glycol), aliphatic polyester polyol with ethylene glycol segments, polyvinyl alcohol and its copolymers, vinyl pyrrolidone copolymer, trimethylolpropane, pentaerythritol, 1,3-butylene glycol, neopentyl glycol, xylitol, sorbitol, mannitol, maltitol, polymethacrylic acid and polyacrylic acid.

2. The polyester of claim 1 in which $R^1(A)_n$ has an average equivalent weight from 85 to 3000.

3. The polyester of claim 2 in which $R^2(D)_m$ has an average equivalent weight from 85 to 3000.

4. The polyester of claim 3 in which a mole ratio of acceptors, A, to donors, D, is from 1.2:1 to 2.5:1.

5. The polyester of claim 4 in which A comprises (meth)acrylate groups and D comprises β-diketo or β-cyanoketo moieties.

6. The polyester of claim 5 in which $R^1(A)_n$ has an average equivalent weight from 100 to 1000 and $R^2(D)_m$ has an average equivalent weight from 100 to 1000.

7. The polyester of claim 6 in which n is an integer from 2 to 4 and m is an integer from 2 to 4.

8. The polyester of claim 1 in which $R^1$ and $R^2$ are selected from the group consisting of poly(ethylene glycol), aliphatic polyester polyol with ethylene glycol segments, trimethylolpropane, pentaerythritol, 1,3-butylene glycol, neopentyl glycol, xylitol, sorbitol, mannitol, maltitol, polymethacrylic acid and polyacrylic acid.

* * * * *